US008452084B2

(12) United States Patent
Ben-Moshe et al.

(10) Patent No.: US 8,452,084 B2
(45) Date of Patent: May 28, 2013

(54) METHOD FOR COMPRESSING ELEVATION MAPS

(75) Inventors: Boaz Ben-Moshe, Herzliya (IL); Liad Serruya, Katzrin (IL); Arik Shamir, Jerusalem (IL)

(73) Assignee: Ariel-University Research and Development Company Ltd., Ariel (IL)

( * ) Notice: Subject to any disclaimer, the term of this patent is extended or adjusted under 35 U.S.C. 154(b) by 409 days.

(21) Appl. No.: 12/532,969

(22) PCT Filed: Mar. 31, 2008

(86) PCT No.: PCT/IL2008/000451
§ 371 (c)(1),
(2), (4) Date: Oct. 29, 2009

(87) PCT Pub. No.: WO2008/120211
PCT Pub. Date: Oct. 9, 2008

(65) Prior Publication Data
US 2010/0061626 A1    Mar. 11, 2010

(30) Foreign Application Priority Data
Apr. 1, 2007  (IL) .......................................... 182367

(51) Int. Cl.
G06K 9/00    (2006.01)
G06K 9/46    (2006.01)

(52) U.S. Cl.
USPC ............................ 382/163; 382/239; 382/166

(58) Field of Classification Search
USPC ......................................... 382/163, 166, 239
See application file for complete search history.

(56) References Cited

U.S. PATENT DOCUMENTS

| 5,751,852 A * | 5/1998 | Marimont et al. ............. 382/180 |
| 5,809,179 A * | 9/1998 | Marimont et al. ............. 382/254 |
| 7,027,658 B2 | 4/2006 | Osher et al. |
| 2001/0046327 A1 | 11/2001 | Osher et al. |
| 2008/0133554 A1 * | 6/2008 | Lee et al. ....................... 707/100 |

FOREIGN PATENT DOCUMENTS

WO    WO 2006/057477 A1    6/2006

OTHER PUBLICATIONS

Lee et al., "Method for Storing Multipurpose Geographic Information", WO 2006/057477 A1 (Jun. 1, 2006).*
Kweon et al., "Extracting Topographic Terrain Features from Elevation Maps", vol. 35 Image Understanding, Mar. 2004, No. 2, Orlando, FL, US.*
Shatz et al.,, "Image Adaptation With Target Size, Quality and Resolution Constraints", WO 2006/085301 A2 (Aug. 17, 2006).*

(Continued)

*Primary Examiner* — Chan S Park
*Assistant Examiner* — Ha Le
(74) *Attorney, Agent, or Firm* — Michael J. Feigin, Esq.; Feigin & Associates, LLC PatentLawNY.com

(57) ABSTRACT

A method for compressing an elevation map by means of digital image processing, according to which local and global parameters of an elevation map are calculated for sorting the elevation map into a corresponding category and the elevation map is categorized according to the calculated local and global parameters. Optimal parameters for compressing the elevation map are determined according to the calculated local and global parameters and according to the corresponding category and then the elevation map is compressed by applying on it digital image processing by using the determined optimal compression parameters.

10 Claims, 2 Drawing Sheets

OTHER PUBLICATIONS

Pasi Franti, Eugene Ageenko, Pavel Kopylov, Sami Grohn, Florian Berger, "Compression of map images for real-time applications", Image and Vision Computing 22 (2004) 1105-1115.*

Shantanu D Rane et al: "Evaluation of JPEG-LS, the New Lossless and Controlled-Lossy Still Image Compression Standard, for Compression of High-Resolution Elevation Data". IEEE Transactions on Geoscience and Remote Sensing, IEEE Service Center, Piscataway, NJ, US, vol. 39, No. 9, Oct. 1, 2001, XP011021859.

Panchagnula R V et al: "Near-lossless compression of digital terrain elevation data". Proceedings of the SPIE—The International Society for Optical Engineering SPIE-Int. Soc. Opt. Eng USA, vol. 5308, No. 1, 2004, pp. 331-342, XP002484140.

Boucheron L E et al: "Lossless Wavelet-Based Compression of Digital Elevation Maps for Fast and Efficient Search and Retrieval". IEEE Transactions on Geoscience and Remote Sensing, IEEE Service Center, Piscataway, NJ, US, vol. 43, No. 5, May 1, 2005, pp. 1210-1214, XP011130909.

Liqiang Zhang et al: "Implementing an algorithm for lossy compressing elevation data based on SPIHT". Geoscience and Remote Sensing Symposium, 2004. IGARSS '04. Proceedings, 2004 IEEE International Anchorage, AK, USA Sep. 20-24, 2004, Piscataway, NJ, USA, IEEE, vol. 4, Sep. 20, 2004, pp. 2522-2523, XP010751372.

Arandiga F et al: "Morse Description and Geometric Encoding of Digital Elevation Maps". IEEE Transactions on Image Processing, IEEE Service Center, Piscataway, NJ, US, vol. 13, No. 9, Sep. 1, 2004, pp. 1245-1262, XP011116346.

Andrew Kim et al: "Hierarchical Stochastic Modeling of SAR Imagery for Segmentation/Compression". IEEE Transactions on Signal Processing, IEEE Service Center, New York, NY, US, vol. 47, No. 2, Feb. 1, 1999, XP011058441.

Chang L: "Multispectral image compression using eigenregion-based segmentation" Pattern Recognition, Elsevier, GB, vol. 37, No. 6, Jun. 1, 2004, pp. 1233-1243, XP004505323.

Kweon I S et al: "Extracting Topographic Terrain Features From Elevation Maps" CVGIP Image Understanding, Academic Press, Duluth, MA, US, vol. 59, No. 2, Mar. 1, 1994, pp. 171-182, XP000439838.

Boaz Ben-Moshe, Liad Serruya, Ariel Shamir: "Image Compression Terrain Simplification". 19. Canadian Conference on Computational Geometry, CCCG 2007, ISBN 978-0-7709-0520-0, 2020—Aug. 22, 2007 pp. 125-128, XP002494141 Ottawa, Canada.

* cited by examiner

METHOD FOR COMPRESSING ELEVATION MAPS

FIELD OF THE INVENTION

The present invention relates to terrain simplification methods. More particularly, the invention relates to an Image Compression Terrain Simplification (ICTS) method for the terrain simplification and for compressing elevation maps in an efficient and relatively fast way, providing the compressed elevation maps in relatively high geometric quality.

DEFINITIONS, ACRONYMS AND ABBREVIATIONS

Throughout this specification, the following definitions are employed:

DEM: is a short for the Digital Elevation Model that is a type of a digital terrain model, recording a topographical representation of the terrain of the Earth or another surface in the digital format, and making it possible to digitally produce elevation maps.

DTED: is a short for Digital Terrain Elevation Data that is a standard digital dataset, which is a uniform matrix of terrain elevation values providing basic quantitative data for systems and applications that require terrain elevation, slope, and/or surface roughness information.

Elevation map: is a representation on a flat surface of any region that depicts the elevation of that region. The elevation map is usually divided into pixels and stores the elevation of each pixel.

JPEG: is a short for the Joint Photographic Experts Group that is a name of a committee who has developed the JPEG compression standard. JPEG standard provides lossy compression of images. The file format which employs this compression is commonly called JPEG.

JPEG 2000: is a wavelet-based image compression standard that has been designed as the successor of the JPEG compression standard. One of its main differences from the JPEG compression standard is that the JPEG 2000 standard includes a lossless mode for image compression, whereas the JPEG standard always uses a lossy image compression algorithm(s).

BACKGROUND OF THE INVENTION

Uncompressed multimedia data requires considerable storage capacity and transmission bandwidth. In spite of the rapid progress in mass-storage density, processing speeds, and digital communication system performance, the demand for the data storage capacity and data-transmission bandwidth continues to outstrip the capabilities of available technologies. The recent growth of various multimedia-based applications, GISs (Geographic Information Systems), games, etc. have the increasing need for developing efficient ways for encoding and compressing images (particularly, elevation maps), data signals, Digital Terrain Elevation Data (DTED) and the like.

The prior art data compression methods/standards are either lossy or lossless. The compression ratio of conventional lossless methods (such as Huffman encoding, Arithmetic encoding, LZW (Lempel-Ziv-Welch) encoding) is relatively low and not high enough for providing efficient image and/or video compression, especially when the distribution of pixel values within the image is relatively flat. Thus, the images compressed by such methods usually cannot be displayed on mobile devices (such as cellular phones, PDAs (Personal Digital Assistants), etc.) due to the limited computation power and limited memory resources.

Earth surface images are similar to the most natural scene images, where the data or pixel values vary across a 2-D (dimensional) field. Usually, the earth surface contents change relatively slow within each elevation map, and the pixel intensity values do not significantly alter up and down in a small area of said each elevation map. If we represent an image in the spatial frequency domain, then the lower spatial frequency components of the image contain more information than the high frequency components, which usually relate to the less important image details and to noises within the image. In addition, humans are more receptive to the loss of higher spatial frequency components than to the loss of lower frequency components. Thus, for improving image compression, high frequency components of the image can be disregarded.

The dramatically increasing interest of people all over the world in GIS (Geographic Information System) applications (such as Google™ Earth, etc.), in particular presenting real-time/off-line earth surface maps (e.g., for navigation purposes), leads to the continuous need for developing efficient compression methods for elevating earth surface maps. In addition, GIS applications support receiving users' local queries over the elevation maps (e.g., determining the location of a specific point within each elevation map (user's point location query), approximating the height of said specific point, determining whether two points within the elevation map are located in a common field of view (user's visibility query), etc.). Such user's geometric queries can be performed efficiently over the compressed elevation maps and terrain images, and there is no need to uncompress them for answering such queries.

The prior art presents a number of terrain simplification methods/algorithms, such as combinatorial methods and lossless methods. The combinatorial methods for terrain simplification use a height (e.g., of an object within the terrain image) as an input (typically a rectangular grid of elevation data) and approximate it with a mesh of triangles of the terrain surface (this is also known as a triangulated irregular network (TIN)). The combinatorial methods attempt to minimize both the error and the number of triangles used for the approximation. These methods are often based on the 2-D triangulations (Delaunay triangulations) to create the triangular irregular networks. However, these methods are slow by nature due to the TIN terrain representation that require large computational resources, leading to the large error rate and to the low compression rate, and as a result, to a large file size and inefficient runtime.

The conventional combinatorial methods/algorithms for terrain simplification include Terra, GcTin, QSlim and others. The Terra algorithm is based on a greedy insertion algorithm with some optimizations to make it run faster. The input to the Terra algorithm is a height (e.g., of an object within the terrain image). It starts with the triangulation of the terrain surface, and then iteratively adds vertices according to which the input point has the greatest vertical error with respect to the approximating surface. After that, the retriangulation is performed by using the 2-D triangulation. Another combinatorial method, the GcTin method, employs an advancing-front technique for simplification of digitalized terrain models. The algorithm takes greedy cuts (bites) out of a closed polygon that bounds a connected component of the yet to be triangulated region, and then starts processing a large polygon, bounding the whole extent of the terrain to be triangulated, and works its way inward, performing at each step one of three basic operations: ear cutting, greedy biting, and edge splitting. One of the main advantages of the GcTin method is that it requires relatively low memory resources in addition to the memory resources required for processing an input height array. Still another combinatorial method, the QSlim method, is designed for simplifying all types of 3D (dimensional) surfaces, not just terrains. QSlim uses edge contraction for performing the terrain simplification, while employing a quadric error measurement for the efficiency and for visual fidelity. However, all these terrain simplification methods do not provide sufficient results and the compressed image has low geometric quality and large file size. In addition, MSE error (Mean Squared Error), MAE error (Mean Absolute Error) and RMS error (Root Mean Squared Error) of the compressed image are high, and the PSNR (Peak Signal-to-Noise Ratio) of said compressed image is relatively low, corresponding to high error rates.

The lossless compression methods for terrain simplification, such as JPEG-LS, JPEG2000-Lossless use DIP (Digital Image Processing), and they are implemented when it is important for the original and the decompressed image to be identical, or when no assumption can be made on whether certain deviations in the compressed image (compared to the original not compressed image) are uncritical. As a result, images compressed by means of the conventional lossless compression methods are large in size.

WO 2006/057477 presents a method for storing multipurpose geographic information, capable of integrating, storing, managing and using vector data (numerical map) and image, digital elevation model (DEM), three-dimensional (3D) point cloud data, and facility texture information. The method for storing multipurpose geographic information in a computing system includes the steps of: dividing geographic information data to be stored into minimum units; classifying the divided geographic information data into geometric information (geographic position information) and attribute information; and storing the geometric information (geographic position information) in a vector format and storing the attribute information in an attribute information linked to a vector. However, WO 2006/057477 does not teach performing preprocessing of an elevation map to be compressed, and does not teach implementing digital image processing methods for performing terrain simplification.

It is an object of the present invention to provide a terrain simplification method that is based on conventional digital image processing methods (which are originally designed for compressing natural scene images and not elevation maps), while significantly improving these methods to fit them for compressing said elevation maps and terrain images and to achieve an optimal visual and geometric quality of each compressed image.

It is still another object of the present invention to provide a terrain simplification method that is relatively fast, accurate, compact and efficient.

It is still another object of the present invention to provide a terrain simplification method that is relatively simple and robust, and therefore can be implemented on a large range of hardware, leading to dramatic improvements in runtime and compression efficiency.

It is still another object of the present invention to provide a terrain simplification method, in which a user can define various parameters for compressing each terrain image, such as the desirable size of the compressed terrain image, time for processing the terrain image, accuracy (quality) of said processing, acceptable error rate, etc.

It is still another object of the present invention to provide a terrain simplification method, which can be further employed on mobile devices (such as cellular phones, PDAs, etc.) that have relatively low computational power.

It is a further object of the present invention to provide a terrain simplification method for use in various applications, such as mapping applications, games, map-warehouse-storage applications, and many others.

It is still a further object of the present invention to provide a novel file format for compressing elevation maps.

It is still a further object of the present invention to provide a terrain simplification method, which is user friendly.

Other objects and advantages of the invention will become apparent as the description proceeds.

SUMMARY OF THE INVENTION

The present invention relates to a method for the terrain simplification and for compressing elevation maps in an efficient and relatively fast way, providing the compressed elevation maps in relatively high geometric quality.

The method is used for compressing an elevation map by means of digital image processing by: (a) calculating local and global parameters of an elevation map for sorting the elevation map into a corresponding category; (b) categorizing the elevation map according to the calculated local and global parameters; (c) determining optimal parameters for compressing the elevation map according to the calculated local and global parameters and according to the corresponding category; and (d) compressing the elevation map by applying on it digital image processing by using the determined optimal compression parameters.

The elevation map may be converted into a grayscale terrain image for further calculating local and global parameters of the grayscale terrain image. The method may further comprise categorizing the grayscale terrain image according to the calculated local and global parameters and compressing the elevation map by applying on it digital image processing by using the determined optimal compression parameters.

One or more metadata values may be defined, for compressing the elevation map or grayscale terrain image.

According to still another embodiment, the method further comprises selecting the meta data values from one or more of the following: (a) a size of an output compressed image file; (b) a type of an output compressed image file; (c) one or more quantization parameters for compressing the elevation map or grayscale terrain image; (d) maximal acceptable error value of the compressed image; (e) a terrain type to which the elevation map is related; and (f) time for processing the elevation map or grayscale terrain image.

According to still another embodiment, the method further comprises determining the optimal parameters for compressing the elevation map or grayscale terrain image by using the one or more defined metadata values.

According to still another embodiment, the method further comprises evaluating the compressed elevation map or compressed grayscale terrain image.

According to a further embodiment, the method further comprises updating metadata values according to evaluation results.

According to still a further preferred embodiment of the present invention; the method further is used as a file format for the terrain simplification and for compressing elevation maps.

DETAILED DESCRIPTION OF THE PREFERRED EMBODIMENTS

Figure 1:
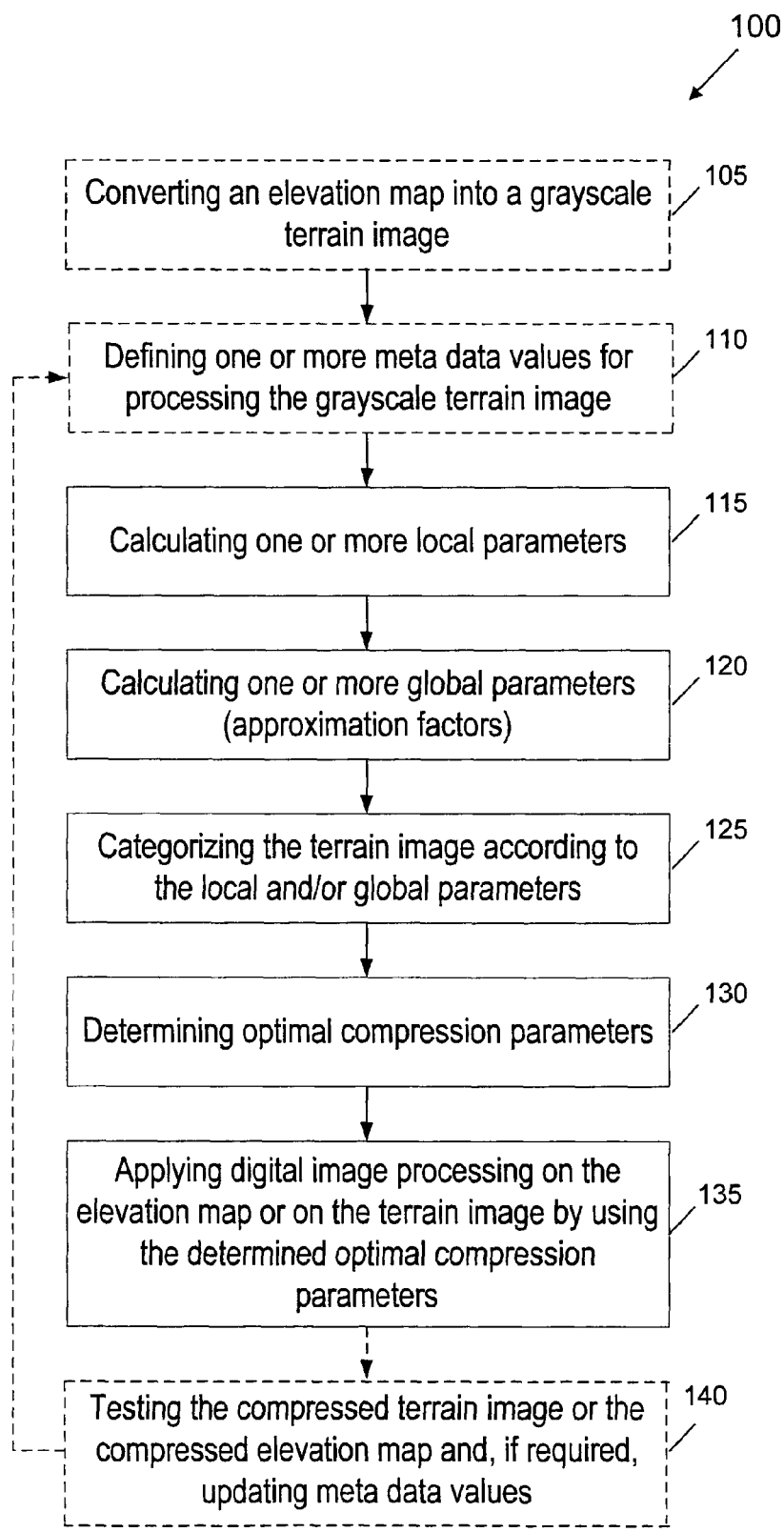
FIG. 1 is a flow chart of an image compression terrain simplification (ICTS) method for compressing elevation maps, according to a preferred embodiment of the present invention.

FIG. 1 is a flow chart 100 of an image compression terrain simplification (ICTS) method for compressing elevation maps, according to a preferred embodiment of the present invention. The ICTS method comprises: (a) a preprocessing stage (steps 105 to 130) for converting an elevation map into a corresponding grayscale terrain image, and calculating local and global parameters of each terrain image, classifying (categorizing) each terrain image and, as a result, determining optimal compression parameters (such as quantization parameters) for compressing said image; and (b) a conventional digital image processing stage (step 135) for performing optimal compression of the terrain image, according to the determined optimal compression parameters. In addition, the compressed terrain image can be further tested (step 140) by a user, and if required, the compression parameters can be further updated.

It is supposed, for example, that an input for the ICTS method is a grid-based elevation map or any other grid-based structure. If the input is, for example, a mesh of triangles of the terrain surface (a triangulated irregular network (TIN)) that is not a grid-based structure, then it is converted to the grid-based structure by means of conventional techniques, such as sampling the terrain surface by scanning it with a fixed sampling step.

At step 105, the elevation map is sampled and converted into a grayscale terrain image; each sample of the elevation map (positive and negative height field) is converted into a corresponding grayscale pixel value, for simplifying processing of said elevation map image. It should be noted that this step is optional, and it can be implemented on mobile devices (such as cellular phones, PDAs (Personal Digital Assistants), GPS (Global Positioning System) devices, etc.) due to their relatively low computational power that does not allow processing of elevation maps (which are relatively complex for processing). In addition, due to the fact that the compression on the mobile devices is usually performed by means of dedicated hardware units, it may be further required to convert an elevation map image into a grayscale image with a specific (fixed) grayscale range of gray levels. The grayscale range can be represented, for example, by 8, 16, 24, or 32 bit integers or by any "real" number (fixed or floating point "real" number). At step 110, the user can set (define) one or more meta data values, such as a size of an output compressed image file, to which the terrain image should be compressed; a corresponding file type; one or more quantization parameters (compression rate); maximal acceptable error value of the compressed image in comparison to the original (not compressed) image; a terrain type (flat or hilly terrain, etc.); time for processing said terrain image; etc. Then, at step 115, one or more local parameters are calculated for determining optimal compression parameters. The local parameters can be, for example, minimal and/or maximal height of the terrain illustrated on the image; an average height difference between each pixel within said image and its neighbor pixels (e.g., 8 neighbor pixels); a standard deviation of said average height difference; etc. It should be noted that the average height difference can be computed by gradually sliding a fixed-size window (e.g., a square window having a length and width of 3 pixels) over the whole terrain image and comparing each pixel value to the value of its neighbor pixels. At step 120, one or more global parameters (global approximation factors) are calculated for determining optimal compression parameters.

The global approximation factors can be, for example, a rough approximation of the water flow and the watershed of the terrain; a rough division of the terrain into homologous portions (it is supposed that the whole terrain image is not homologous); etc. It should be noted that the global approximation factors can be computed statistically. At step 125, the terrain image is categorized according to the above-calculated local and global parameters, and based on the one or more meta data values that are set by the user at step 110. The types of categories can be, for example, as follows:

Natural terrain images (comprising the water flow and/or watershed):
  flat or almost flat terrain images;
  terrain images that contain mostly dunes (dunes have unique shape of the water flow/watershed);
  hilly terrain images;
  smooth mountains terrain images;
  peaks and cliffs terrain images (e.g., comprising non-smooth mountains).
Natural terrain images with artifacts (comprising the water flow and/or watershed):
  terrain images comprising, for example, a lake and/or sea;
  terrain images that illustrate buildings.
Natural terrain images without the water flow and/or watershed (e.g., the ocean or moon surface):
  ocean surface terrain images;
  planets surface terrain images.
Artificial terrains images (such as city images, game images, etc.).

Then at step 130, after the local and global parameters are calculated, and after the terrain image is sorted into its corresponding category, the optimal compression parameters are determined accordingly, based on said calculated local and global parameters and based on said selected corresponding category. The compression parameters can be, for example, quantization parameters, a number of blocks and a corresponding size of each block, to which the terrain image is divided for being compressed; a compressed image file size; etc. Then at step 135, the terrain image (or the elevation map, if step 105 is skipped) is compressed by means of one or more conventional digital image processing (DIP) methods (by performing, for example, DCT (Discrete Cosine Transform) or Fourier transform), using the above determined optimal compression parameters. At step 140, the compressed terrain image or the compressed elevation map can be further tested (evaluated) by the user in order to determine whether it has, for example, the sufficient quality. If comparing to the original (not compressed) terrain image 205 (or to the original elevation map), the compressed terrain image (or the compressed elevation map) has insufficient quality and has to be recompressed, then the meta data values are updated at step 110, and after that, steps 115 to 135 are repeated.

Figure 2A:
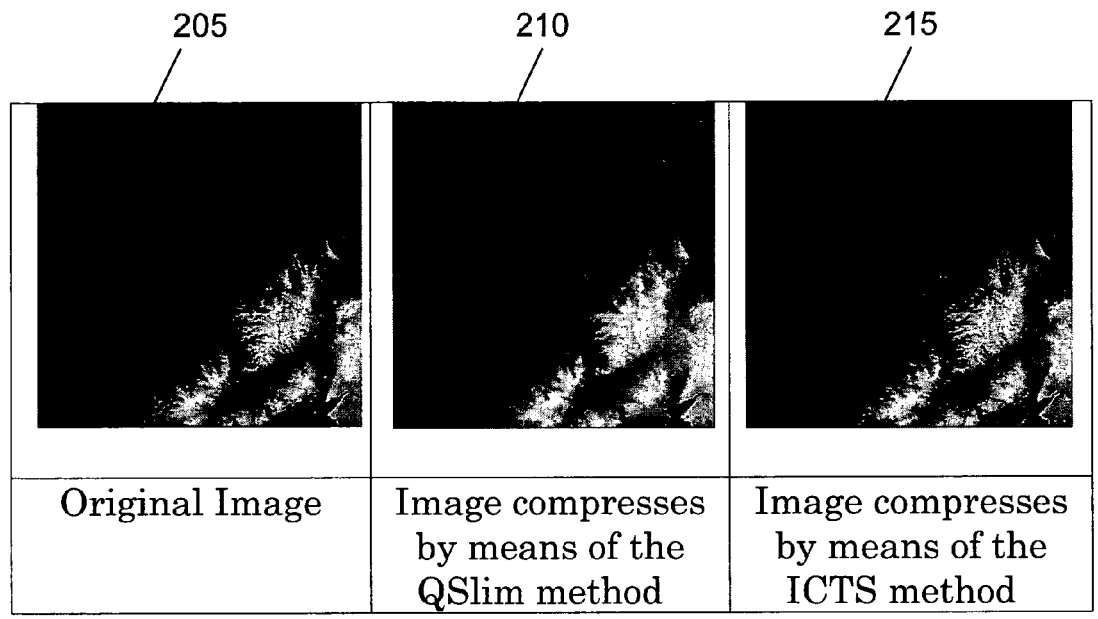
FIG. 2A presents images compressed by means of a conventional terrain simplification method (such as the QSlim method) and the ICTS method, according to a preferred embodiment of the present invention.

FIG. 2A presents images compressed by means of a conventional terrain simplification method (such as the QSlim method) and the ICTS method, according to a preferred embodiment of the present invention. Original terrain image 205 is compressed by means of the conventional QSlim terrain simplification method, and as a result, image 210 is obtained. On the other hand, original terrain image 205 is compressed by means of the ICTS method, according to a preferred embodiment of the present invention, and then image 215 is obtained. The file size of image 210 is equal to the file size of image 215, however as it is seen from FIG. 2A, image 215 has better visual quality than image 210.

Figure 2B:
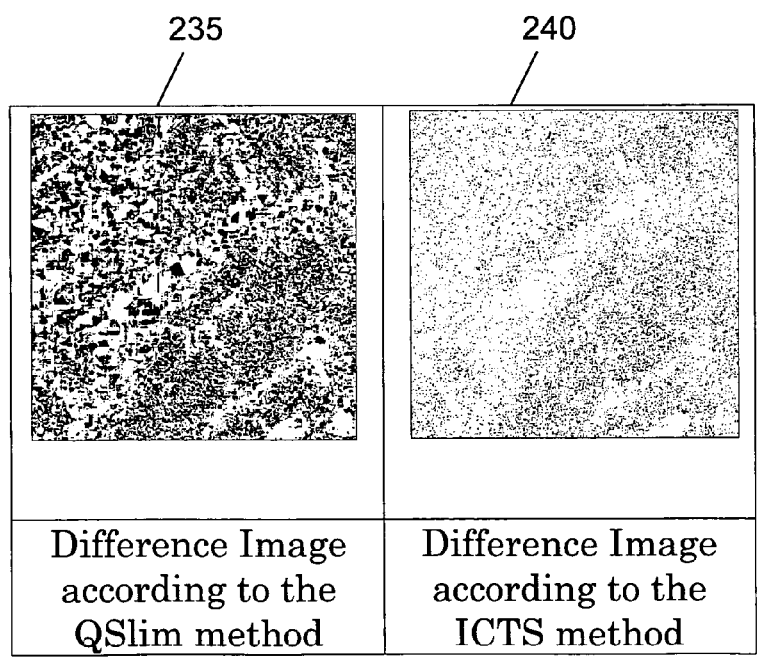
FIG. 2B presents difference images, each of which illustrates a difference between the original image and corresponding compressed image, according to a preferred embodiment of the present invention.

FIG. 2B presents difference images 235 and 240, each of which illustrates a difference between original image 205 (FIG. 2A) and the corresponding compressed image (image 210 or 215 as shown on FIG. 2A), according to a preferred embodiment of the present invention. Image 235 illustrates a difference between original image 205 and image 210, which is compressed by means of the QSlim terrain simplification method; and image 240 illustrates a difference between original image 205 and image 215, which is compressed by means of the ICTS terrain simplification method. As it is seen from FIG. 2B, image 235 has many more white dots than image 240, indicating that the difference between compressed image 210 and original image 205 is much greater than the difference between compressed image 215 and said original image 205. The visual quality of image 215 is better than the visual quality of image 210, and the visual quality of image 215 is closer to the visual quality of original image 205. Table 1 below, presents comparison compression data of sample compressed elevation maps (Image 1, and Image 2 that is terrain image 205 of FIG. 2A) that are compressed by the conventional QSlim terrain simplification method and by the presented ICTS method, according to a preferred embodiment of the present invention. The compression parameters for obtaining said sample compressed images (Image 1 and Image 2) were selected such that the file size of each corresponding compressed elevation map (compressed by means of the QSlim and ICTS methods) is equal: the file size of Image 1 compressed by means of the QSlim method is equal to the file size of said Image 1 compressed by means of the ICTS method, and similarly the corresponding file sizes of Image 2 are equal.

TABLE 1

| Measures | Image 1 | | Image 2 | | Average Image | |
| --- | --- | --- | --- | --- | --- | --- |
| | ICTS | QSlim | ICTS | QSlim | ICTS | QSlim |
| MSE | 0.1045 | 5.6736 | 0.0844 | 4.9408 | 0.0944 | 5.1204 |
| MAE | 0.1045 | 1.7047 | 0.0841 | 1.4753 | 0.0943 | 1.5049 |
| RMS | 0.3233 | 2.3819 | 0.2906 | 2.2228 | 0.3067 | 2.261133 |
| PSNR | 57.9387 | 40.5922 | 58.8654 | 41.1928 | 58.307 | 41.0506 |

MSE is a mean squared error; MAE is a mean absolute error; RMS is a root mean squared error; and PSNR is a peak signal-to-noise ratio.

It should be noted that each image compressed by means of the Qslim terrain simplification method (as shown in Table 1) was further compressed by means of a conventional ZIP (Zone Information Protocol) data compression format for obtaining even more compressed image. Thus, the QSlim compression data as presented in Table 1, terrain image 210, and its corresponding difference image 235—are provided after performing said ZIP compression (the file size of each image after performing the ZIP compression is equal to the same after implementing the ICTS method). However, even after performing said ZIP compression, each image compressed by means of the conventional QSlim method has worse visual and geometric quality than the same compressed by implementing the ICTS method, according to a preferred embodiment of the present invention.

In addition, it should be noted that the runtime for processing a terrain image (or an elevation map) by means of the ICTS method is significantly lower than the runtime for processing said terrain image (or said elevation map) by means of each of the conventional terrain simplification methods, such as QSlim, Terra, GcTin or other processing methods, such as JPEG, etc.

According to a preferred embodiment of the present invention, the ICTS method is used as a file format for the terrain simplification and for compressing elevation maps. Also, the ICTS file format supports receiving users' local queries over the elevation maps (e.g., determining the location of a specific point within each elevation map (user's point location query), approximating the height of said specific point, determining whether two points within the elevation map are located in a common field of view (user's visibility query), etc.). Such user's geometric queries can be performed efficiently over the compressed elevation maps and terrain images, and there is no need to uncompress them for answering such queries. In addition, the elevation maps and terrain images compressed by the ICTS method can be efficiently uncompressed.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A method for compressing an uncategorized elevation map by means of digital image processing, comprising:
   a. converting said uncategorized elevation map into corresponding one or more uncategorized grayscale terrain images;
   b. calculating local and global parameters of said one or more uncategorized grayscale terrain images, which local and global parameters are based on contents of said one or more uncategorized grayscale terrain images;
   c. categorizing said one or more uncategorized grayscale terrain images into a corresponding category according to the calculated local and global parameters, wherein said corresponding category is based on contents of said one or more uncategorized grayscale terrain images;
   d. selecting optimal compression parameters for compressing said one or more categorized grayscale terrain images, wherein said optimal compression parameters are selected based on the calculated local and global parameters and based on said category into which said one or more grayscale terrain image is categorized; and
   e. compressing said one or more categorized grayscale terrain images by applying to it digital image processing, using said selected optimal compression parameters,
   wherein said calculated local parameters comprise standard deviation of said grayscale terrain image and at least one of minimal height of the terrain and maximal height of the terrain,
   and wherein said calculated global parameters comprise at least one of:
   approximation of water flow of the terrain;
   approximation of watershed of the terrain; and
   division of the terrain into homologous portions.

2. Method according to claim 1, further comprising, prior to said selecting optimal compression parameters, setting one or more metadata values for compressing said uncategorized elevation map or said one or more uncategorized grayscale terrain images.

3. Method according to claim 1, further comprising selecting the metadata values from one or more of the following:
   a. a size of an output compressed image file;
   b. a type of an output compressed image file;
   c. one or more quantization parameters for compressing the elevation map or said one or more grayscale terrain images;
   d. maximal acceptable error value of the compressed image;
   e. a terrain type to which said elevation map is related; and
   f. time for processing said elevation map or said one or more grayscale terrain images.

4. Method according to claim 2, further comprising said selecting said optimal compression parameters for compressing said uncategorized elevation map or said one or more uncategorized grayscale terrain images based on said one or more metadata values.

5. Method according to claim 2, further comprising:
   evaluating the compressed elevation map or compressed grayscale terrain image; and
   if said evaluating is indicative of insufficient compression of said elevation map or said one or more grayscale terrain images, updating said one or more metadata values according to results of said evaluating.

6. Method according to claim 1, further being used as a file format for compressing the elevation map.

7. Method according to claim 1 and wherein said corresponding category is selected from a group consisting of:
   natural terrain images;
   natural terrain images including artifacts;
   natural terrain images without water flow or watershed; and
   artificial terrain images.

8. Method according to claim 7 and wherein said corresponding category is selected from a group consisting of:
   flat terrain images;
   terrain images that contain mostly dunes;
   hilly terrain images;
   smooth mountain terrain images;
   peaks and cliffs terrain images;
   terrain images comprising a body of water;
   terrain images illustrating structures;
   ocean surface terrain images;
   planet surface terrain images;
   city terrain images; and
   gaming images.

9. Method according to claim 1 and wherein said calculated global parameters are calculated statistically.

10. Method according to claim 1, wherein said standard deviation of said grayscale terrain image further comprises a standard deviation of an average height difference between one pixel and its neighboring pixel in said one or more grayscale terrain images.

\* \* \* \* \*